United States Patent [19]

Hodgson et al.

[11] Patent Number: 5,668,821

[45] Date of Patent: Sep. 16, 1997

[54] OPTICAL SYSTEMS AND DEVICES EMPLOYING SPECTRALLY FLATTENED AMPLIFIED SPONTANEOUS EMISSION

[75] Inventors: Craig W. Hodgson, Mountainview, Calif.; Ashish Madhukar Vengsarkar, Berkeley Heights, N.J.

[73] Assignee: Lucent Technologies Inc., Murray Hill, N.J.

[21] Appl. No.: 586,414

[22] Filed: Jan. 16, 1996

[51] Int. Cl.$^6$ .................................................. H01S 3/30
[52] U.S. Cl. ................................... 372/6; 372/102; 385/37
[58] Field of Search ............................ 372/6, 92, 102; 385/37

[56] References Cited

U.S. PATENT DOCUMENTS 5,271,024 12/1993 Huber .................................... 372/6
5,450,427 9/1995 Fermann et al. .................... 372/102

OTHER PUBLICATIONS

D. C. Hall et al. "High–Stability Er/u3/d+–Doped Super-fluorescent Fiber Sources", *Journal of Lightwave Technology*, vol. 13, No. 7, pp. 1452–1460 (1995).

J. S. Lee, et al. "Bandwidth Optimization of a Spectrum–Sliced Fiber Amplifier Light Source Using An Angle–Tuned Fabry–Perot Filter and a Double–Stage Structure", *IEEE Photonics Technology Letters*, vol. 6, No. 10, pp. 1197–1199 (1994).

*Primary Examiner*—Leon Scott, Jr.
*Attorney, Agent, or Firm*—Glen E. Books; Eugen E. Pacher

[57] ABSTRACT

In accordance with the invention a high power, broad bandwidth light source comprises at least one rare earth doped fiber coupled to a long period grating. When the rare earth doped fiber is pumped to operate as an amplified spontaneous emission source, the grating flattens and broadens the output spectrum. Using an Nd doped fiber, applicants have achieved an output power of 25 mW at a center wavelength of 1.08 µm, a spectral width of 40 nm and a coherence length of 10 µm. The source has a flat output spectrum with a maximum slope of 0.1 dB/nm across the full spectral width, and it can be conveniently dropped into any fiber system requiring high power and a broad spectrum. Using an Er-doped fiber, applicants have achieved an output power of 7.3 mW at a center wavelength of 1.55 µm and a spectral width of 38 nm. The source has a flat output spectrum with a maximum ripple of 1.7 dB across the full width. This source is compatible with the needs for a spectrum sliced source.

8 Claims, 3 Drawing Sheets

OPTICAL SYSTEMS AND DEVICES EMPLOYING SPECTRALLY FLATTENED AMPLIFIED SPONTANEOUS EMISSION

FIELD OF THE INVENTION

This invention relates to optical systems and devices and, in particular, to optical systems and devices employing spectrally flattened spontaneous emission sources.

BACKGROUND OF THE INVENTION

Optical fibers are key components in modem telecommunications. Optical fibers are thin stands of glass capable of transmitting an optical signal containing a large amount of information over long distances with very low loss. In essence, an optical fiber is a small diameter waveguide characterized by a core with a first index of refraction surrounded by a cladding having a second (lower) index of refraction. Typical optical fibers are made of high purity silica with minor concentrations of dopants to control the index of refraction.

Broadband light sources for such fiber are useful in a variety of applications. For example contemplated wavelength division multiplexing systems would divide a single broadband light source into a plurality of narrow-band carrier channels, separately modulate the carrier channels and simultaneously transmit the separately modulated channels over a single fiber. Such broadband sources are also potentially useful in fiber sensing systems and in imaging applications.

Unfortunately, conventional light sources fail to provide broad bandwidth light at uniform high levels of power. One conventional approach is to use fibers doped with rare earth elements such as Nd, Er, Yb as spontaneous emission sources. While these sources provide broadband light at low levels of power, their output spectra quickly narrow as the power increases. Moreover, at high pumping powers they tend to lase from small reflections, such as are presented by the fiber endfaces.

Another approach to providing broad bandwidth light is the use of super luminescent diodes. Unfortunately, these devices often fail to provide adequate power, especially after losses incurred in coupling into fiber. Accordingly, there is a need for a new high power, broad bandwidth light source for optical fibers.

SUMMARY OF THE INVENTION

In accordance with the invention a high power, broad bandwidth light source comprises at least one rare earth doped fiber coupled to a long period grating. When the rare earth doped fiber is pumped to operate as an amplified spontaneous emission source, the grating flattens and broadens the output spectrum. Using an Nd doped fiber, applicants have achieved an output power of 25 mW at a center wavelength of 1.08 µm, a spectral width of 40 nm and a coherence length of 10 µm. The source has a flat output spectrum with a maximum slope of 0.1 dB/nm across the full spectral width, and it can be conveniently dropped into any fiber system requiring high power and a broad spectrum.

Using an Er-doped fiber, applicants have achieved an output power of 7.3 mW at a center wavelength of 1.55 µm and a spectral width of 38 nm. The source has a flat output spectrum with a maximum ripple of 1.7 dB across the full width. This source is compatible with the needs for a spectrum sliced source.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for graphical illustrations, are not to scale.

DETAILED DESCRIPTION

Figure 1:
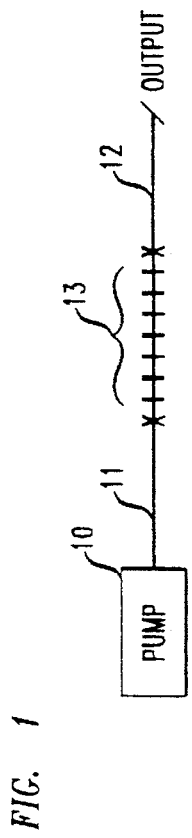
FIG. 1 is a schematic view of a preferred broadband light source comprising dual stages of rare earth doped fiber.

Referring to the drawings, FIG. 1 is a schematic view of a preferred broadband light source comprising a pump source 10, first and second stages 11 and 12, respectively, of rare earth doped optical fiber, and an intervening long period grating 13 to flatten and broaden the spectral output. The pump source 10 is typically a laser, such as a fiber laser, or a fiber pigtailed diode laser for exciting spontaneous optical emission in the rare earth doped fiber. The pump source should have a wavelength shorter than the desired center frequency of the broadband source and is maintained at power levels below those which cause lasing. Each rare earth doped fiber stage 11, 12 comprises a length of glass fiber, such as silica glass fiber, doped with rare earth dopants such as Nd, Er, or Yb typically in the range 50 ppm (for Er) to 20,000 ppm (or 2 mole %) for high power sources that use Yb. The length of the fiber stage is typically in the range 0.1 to 100 m, depending upon the earth dopant level.

The long period grating 13 comprises a length of fiber having a plurality of index perturbations of width w spaced apart by a periodic distance $\Lambda$ where, typically, 10 µm$\leq\Lambda\leq$2000 µm. Advantageously, $\frac{1}{5}\Lambda\leq w\leq\frac{4}{5}\Lambda$ and preferably $w=\frac{1}{2}\Lambda$. The perturbations are preferably formed within the glass core of the fiber and preferably form an angle of θ (2°$\leq\theta\leq$90°) with the longitudinal axis of the fiber. The fiber is designed to transmit broadband light of wavelength centered about a center wavelength λ. In general, long-period grating devices are those in which the period is at least 10 times larger than the wavelength of input light.

The spacing $\Lambda$ of the perturbations is chosen to shift transmitted light in the region of a selected wavelength λp from the guided mode into a non-guided mode, thereby reducing in intensity a band of light centered about λp. In contrast with conventional short period gratings which reflect light, these long period devices remove light wihtout reflection by converting it from a guided mode to an un-guided (or nonguided) mode. A nonguided mode is a mode which is not propagated coherently in the core, and is typically a cladding mode, a radiation mode, or in the case of multilayer profiles, a ring mode.

Figure 2:
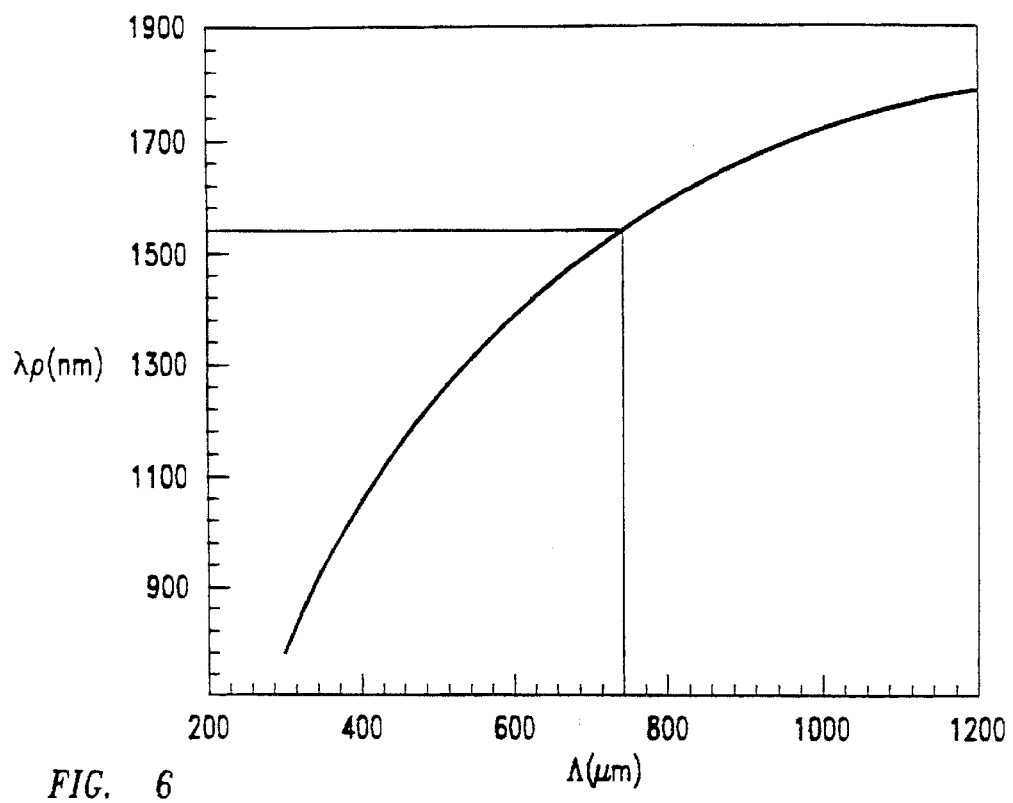
FIG. 2 is a graph useful in the design of a grating for removing light centered about a particular wavelength λp.

FIG. 2 is a graph illustrating the periodic spacing $\Lambda$ for removing light centered about a wavelength λp. Thus, for example, to make a long period grating for removing light centered about 1540 nm, one chooses a spacing of about 760 µm.

Preferably the spectral filter component is a long period grating formed in a single mode optical fiber having a silica core doped with photosensitive material such as a germanium. Further, the fiber can be loaded with molecular hydrogen to enhance its photosensitivity. The long period grating 13 can then be formed by selectively exposing the core to beams intense light of width w at locations separated by Λ.

The preferred exposure source is UV radiation form a KrF excimer laser. Proper spacing can be effected by exposing through a slit of width w and then moving the fiber to the next exposure site. Alternatively, the fiber can be exposed through an amplitude mask. Preferably the exposure dosage for each slit is on the order of 1000 pulses to 10,000 pulses of>100 mJ/cm$^2$ fluence/pulse, and the number of perturbations is in the range 10–300.

In designing the long period grating to flatten and broaden the light source of FIG. 1, one first measures the spectral output of the stages without a long period grating to determine at least one output peak λp. The grating is then designed to remove light from λp.

The extinction ratio of the grating is determined by the height of the peak at λp relative to the rest of the amplified spontaneous emission spectrum. The width and shape of the filtering properties of the grating are made to match the width and shape of-the peak at λp.

To make a source with a long period grating, any deviations from a flat output or desired source spectrum can be inverted and added to the long period grating design. A new long period grating can be made to match the new design. This process can be iterated until the desired source spectrum is achieved.

In the embodiment of FIG. 1 the output is taken from the end of the second stage fiber. Alternatively, the output can be taken from the first stage using a directional coupler to exclude pump light.

The long period grating 13 can be placed at any point along the rare earth doped fiber 11 and 12. In other words, the rare earth doped fiber 11 can be any fraction of the sum length of fiber 11 and 12. In the case where rare earth doped fiber 11 is removed, then the long period grating 13 adds no functionality to the source. In the case where rare earth doped fiber 12 is removed, then the long period grating 13 does add functionality, it performs the filtering function as desired, but there typically is a significant power loss. In the case where rare earth doped fibers 11 and 12 are of similar length, then the long period grating 13 acts as a filter as desired, but the amount of power least is not as significant. For a source there is an optimal amount of rare earth doped fiber 11 before the filter 13 and fiber 12 after the filter 13. This optimal point lies where the filter 13 continues to smooth or shape the output spectrum as desired, but there is a minimal amount of output power lost as compared to an unfiltered source.

Figure 3A:
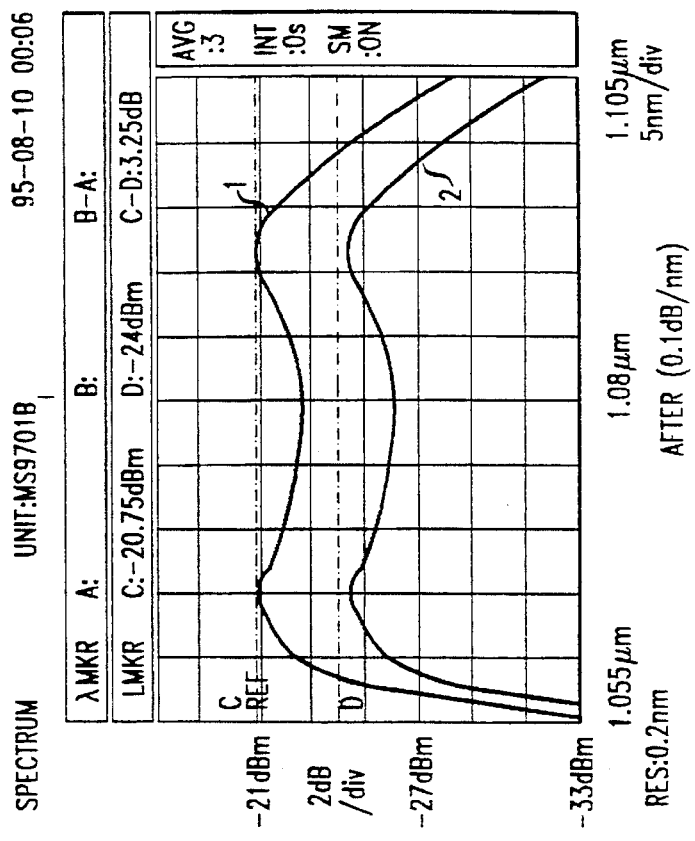
FIGS. 3A and 3B are graphical illustrations of dual stage fiber sources before and after insertion of an intervening long period grating.

The invention will become clearer by considering the following specific example. A rare-earth doped (Nd) fiber source without a grating comprises a 822 nm semiconductor pump diode coupled to a 3.8 m fiber. The device, without a long period grating, was excited to spontaneous emission by the pump, leading to an output power of 34 mw, spectral width of 7 nm and maximum slope of 2.2 dB/nm between 1060 nm and 1100 nm. The output spectrum, shown in FIG. 3A, shows a peak at 1.062 µm. The maximum slope was 2.2 dB/nm.

Figure 3B:
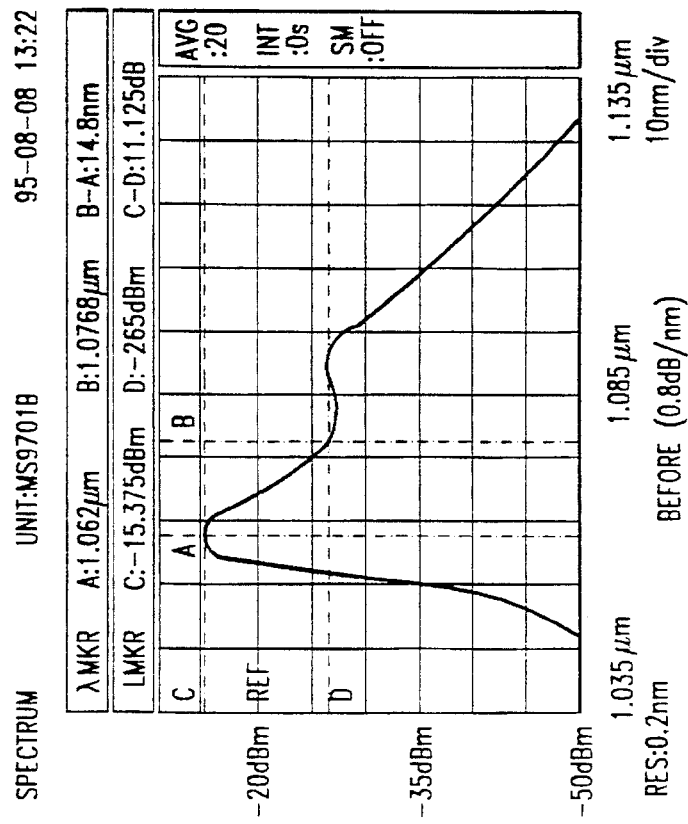

To flatten its spectrum, a long period grating (written in a fiber with cutoff wavelength λc<950 nm) having spacing Λ=210 µm w=105 µm, and length=11 mm was designed to remove light from λp=1.062 µm. When the long period grating was placed between the stages, the new spectral output is shown in FIG. 3B. Curves 1 and 2 show the output from the second stage 12 for two different pump power levels. The output spectrum shape is stable with respect to the changes in the pump power level. The output power for the flattened spectra is 25 mW corresponding to a 1.3 dB loss compared to the unfiltered output. Both curves show a broader, flatter output having a lower maximum slope 0.1 dB/nm.

Figure 4:
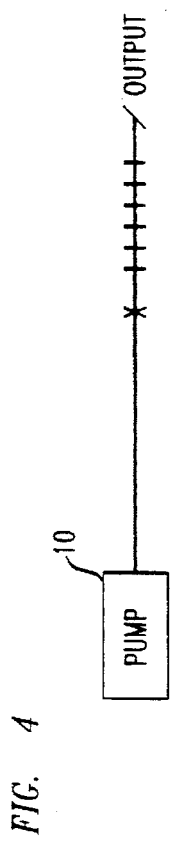
FIG. 4 is a schematic view of an alternative broadband light source comprising a single stage of rare earth doped fiber.

FIG. 4 schematically shows an alternative light source comprising a pump 10, a single stage of rare earth doped fiber 11 and a long period grating 13. The single stage device has an output which is less flat and less efficient than the dual stage device but which is nonetheless a substantial improvement over conventional sources.

Figure 5A:
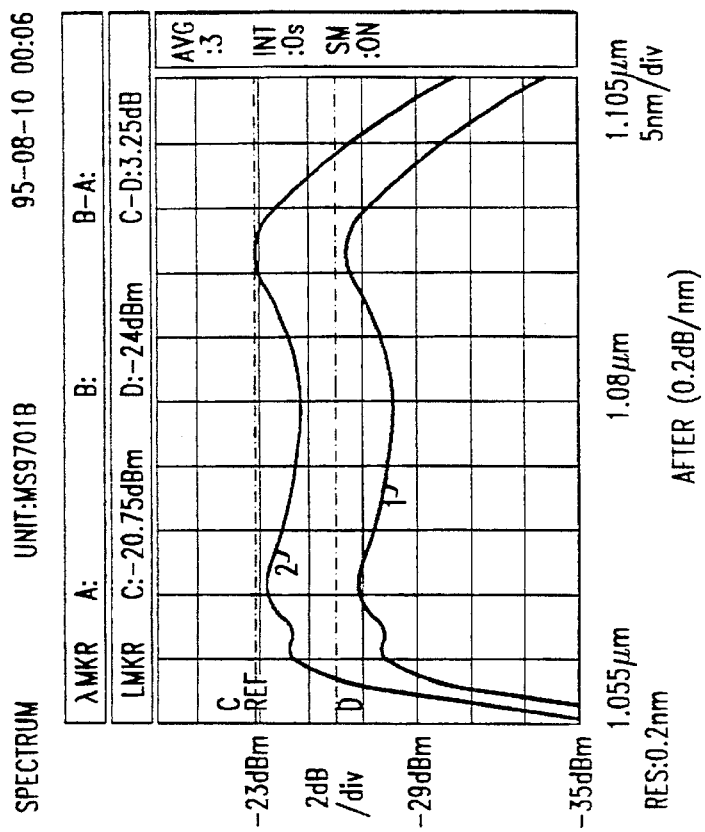
FIGS. 5A and 5B are graphical illustrations of a single stage fiber source before and after insertion of a long period grating.
Figure 5B:
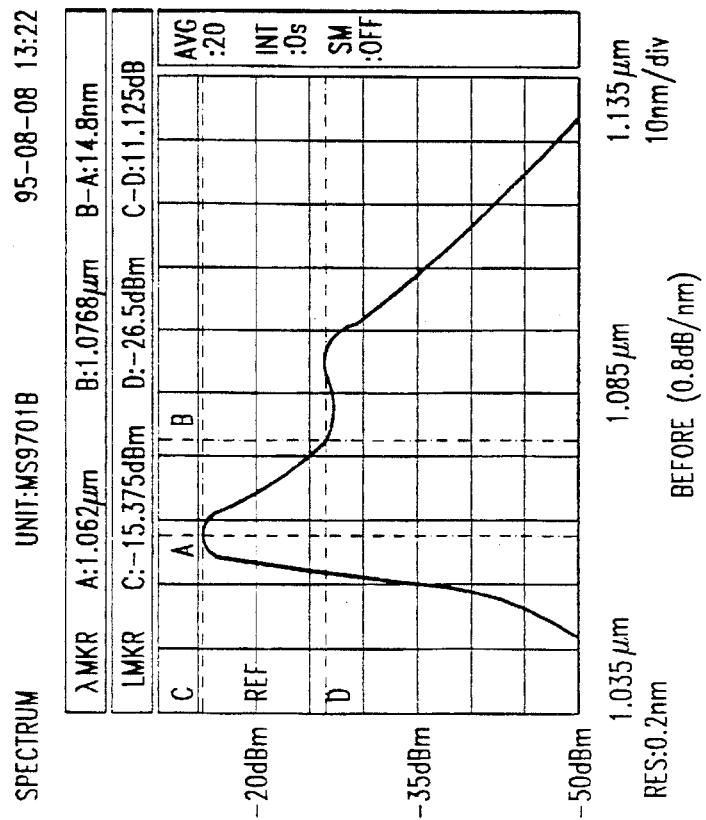

As a specific example, a rare earth doped fiber of Nd without a long period grating exhibited the output spectrum shown in FIG. 5A having a peak at 1.062 µm and a maximum slope of 2.2 dB/nm. With the addition of a long period grating to remove the peak at λp=1.062 µm, the device exhibited the output spectrum shown in FIG. 5B. Curves 1 and 2 are at different input power levels. The maximum slope of 0.2 dB/nm is a 10:1 improvement over the conventional unfiltered device.

In tests the dual stage device performed well over a wide range of operating conditions with output powers from 20 mW down to 100 µW. Over this range, the device maintained a large 40 nm spectral width. At a center wavelength of 1.08 µm, this width corresponds to a coherence length of 10 µm. The single stage device performs well but is not as robust in maintaining its shape over as wide an operating range.

Figure 6:
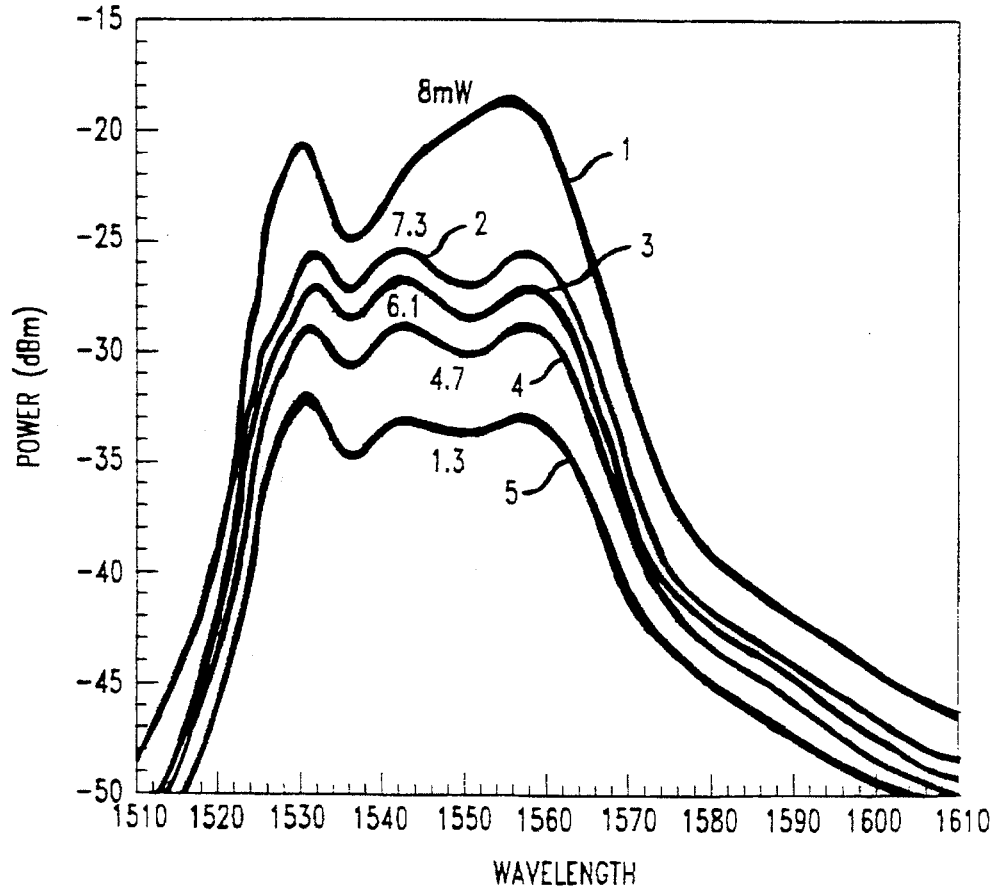
FIG. 6 is a graphical illustration of dual stage fiber sources before and after insertion of an intervening long period grating.

As a further specific example, a source utilizing a rare earth doped fiber of Er and constructed in a manner illustrated in FIG. 1 has an output spectrum illustrated in FIG. 6. Without the long period grating (13) present, the source had an output power of 8 mW and a spectrum as shown in curve 1. With the long period grating and the same pump power, the source had a power of 73 mW and spectrum as shown in curve 2. As the pump (1) power was reduced the other lower power spectrum was produced, curves 3–5. For this case, two filters were added to reduce the peaks at λp 1=1535 nm and λp2=1560 nm. In principle, any number of peaks can be filtered and the source can be further flattened or modified.

It is to be understood that the above-described embodiments are illustrative of only a few of the many possible specific embodiments which can represent applications of the principles of the invention. For example, while FIG. 1 shows only two rare earth doped fiber sections, more than two such sections could be employed. And while only one long period grating is shown in FIGS. 1 and 4, more than one such grating can be employed. Furthermore, different rare earth doped fiber sections in the same device can be doped with different rare earths, and even a single rare earth doped fiber can be doped with more than one rare earth element. Thus and varied other arrangements can be made by those skilled in the art without departing from the spirit and scope of the invention.

The invention claimed is:

1. A broadband light source for optical fiber comprising:

a first length of rare earth doped optical fiber;

a pump source coupled into said fiber for exciting spontaneous optical emission in said fiber; and a long period grating coupled to said rare earth doped fiber for flattening and broadening the spectral output of optical emission from said fiber, said long period grating comprising a length of fiber having a plurality of index perturbations of width w spaced apart by a periodic distance $\Lambda$ where 10 $\mu m \leq \Lambda \leq 2000$ $\mu m$, wherein the periodic distance $\Lambda$ is selected to shift, substantially without reflection, transmitted light in the region of a selected wavelength $\alpha_p$ from a guided mode into a non-guided mode, thereby reducing in intensity a band of light centered about $\lambda_p$.

2. A light source according to claim 1 further comprising a second length of rare earth doped optical fiber coupled to said first length of rare earth doped fiber.

3. A light source according to claim 2 wherein broadband light output is taken from the end of said second length of rare earth doped fiber.

4. A light source according to claim 2 wherein broadband light output is coupled from said first length of rare earth doped fiber.

5. A light source according to claim 1 wherein said rare earth doped fiber is Nd doped fiber.

6. A light source according to claim 1 wherein said rare earth doped fiber is Er doped fiber.

7. A light source according to claim 1 wherein said rare earth doped fiber is doped with Er and Yb.

8. A light source according to claim 1 wherein said rare earth doped fiber is doped with Nd and Yb.

* * * * *